June 16, 1953  J. LOXHAM  2,641,813
QUICKLY RELEASABLE CONNECTING DEVICE
Filed Sept. 27, 1950  4 Sheets-Sheet 1
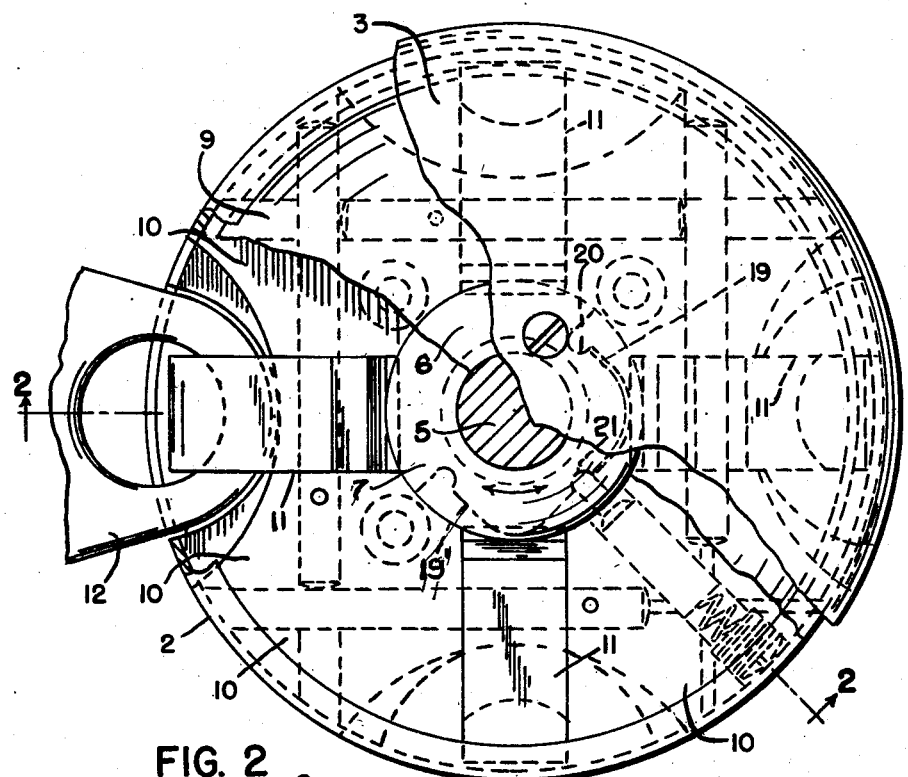
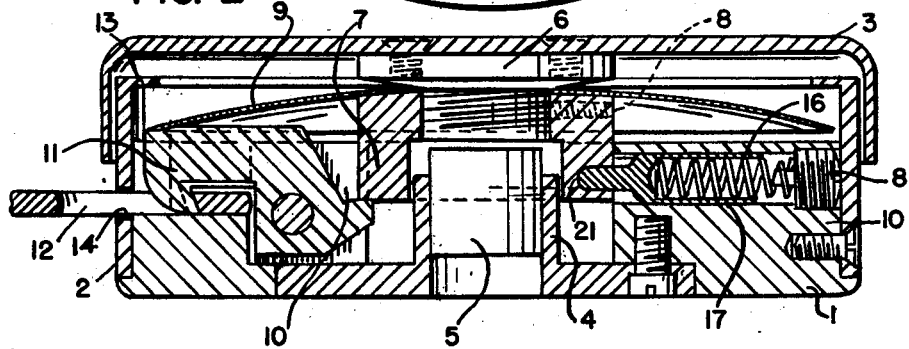
Inventor
John Loxham
Attorneys June 16, 1953  J. LOXHAM  2,641,813
QUICKLY RELEASABLE CONNECTING DEVICE
Filed Sept. 27, 1950  4 Sheets-Sheet 2
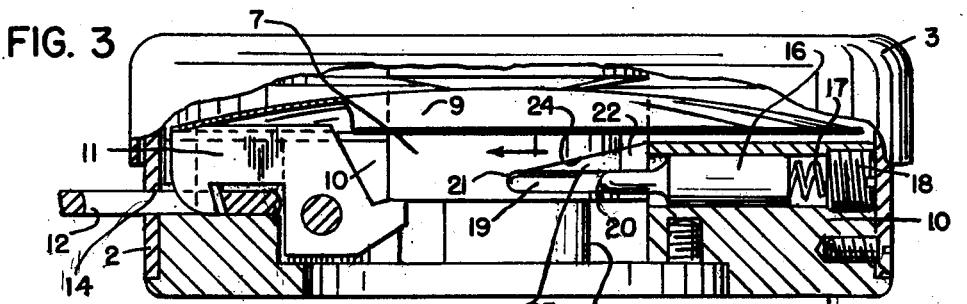
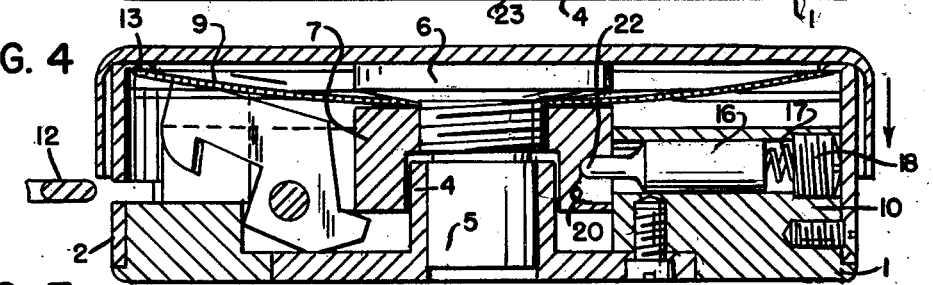
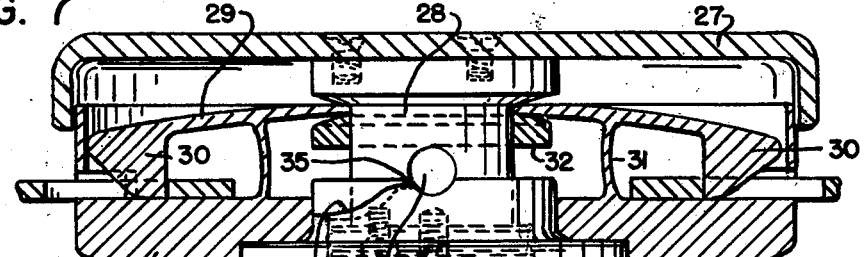
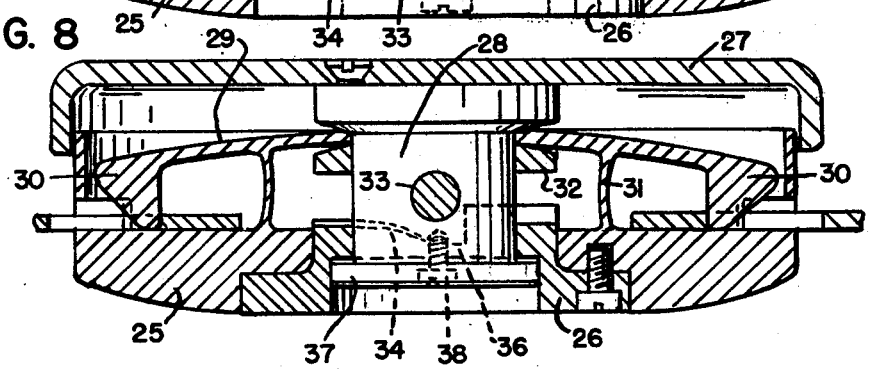
Inventor
John Loxham
By
Lancaster, Allwine & Rommel
Attorneys

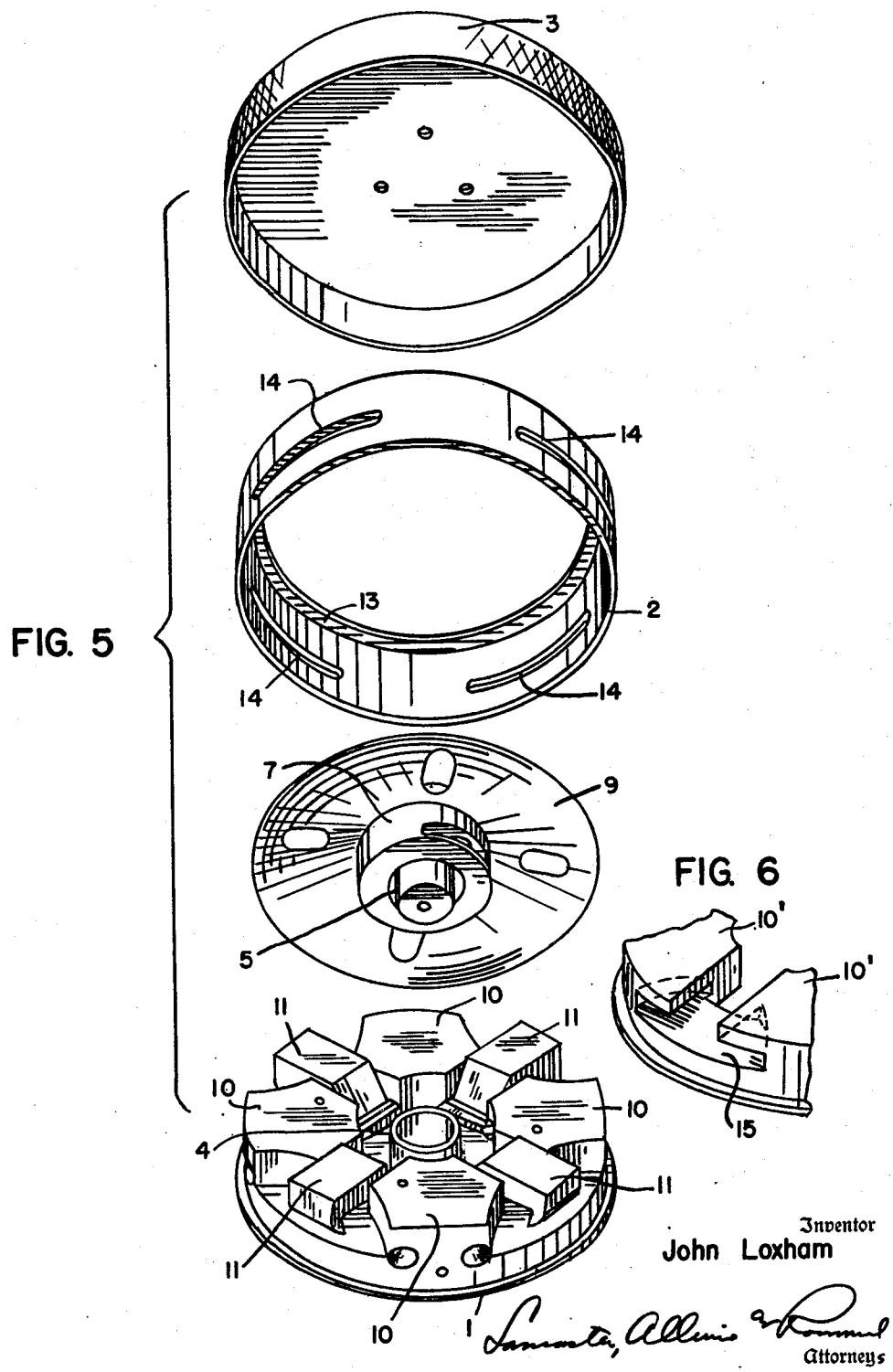

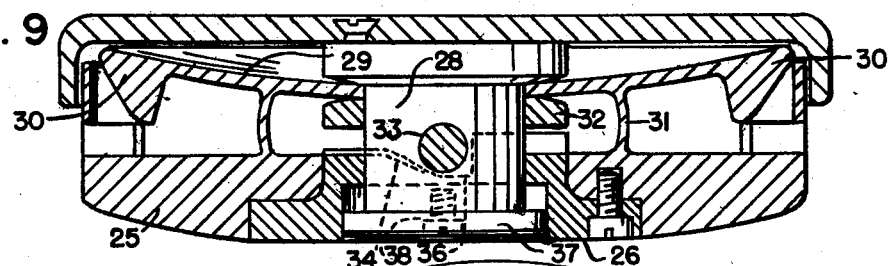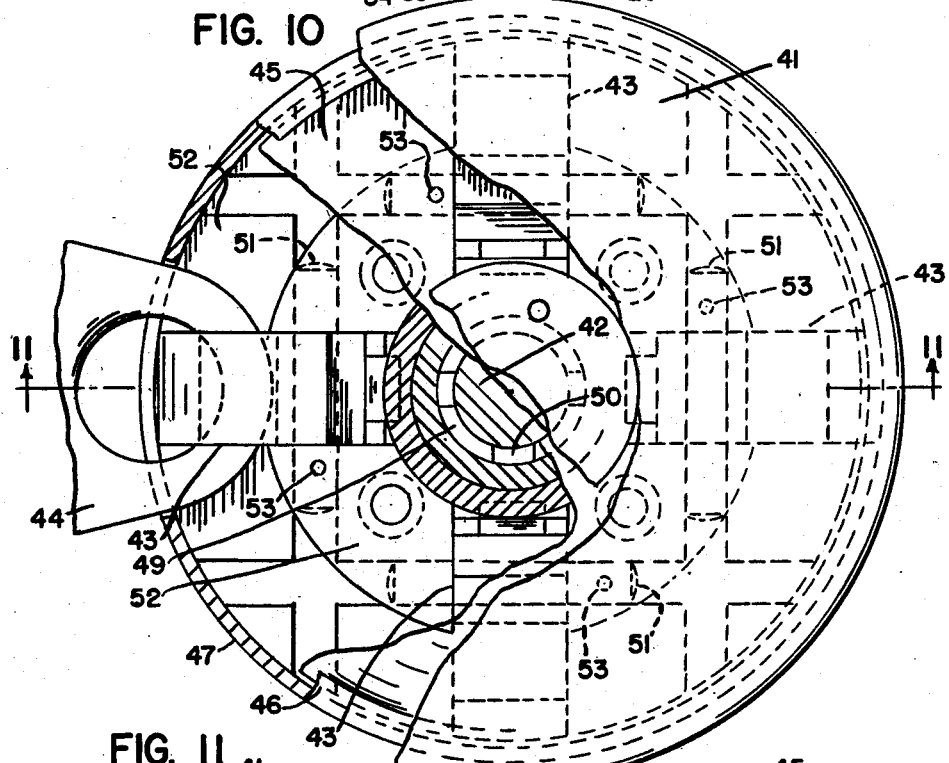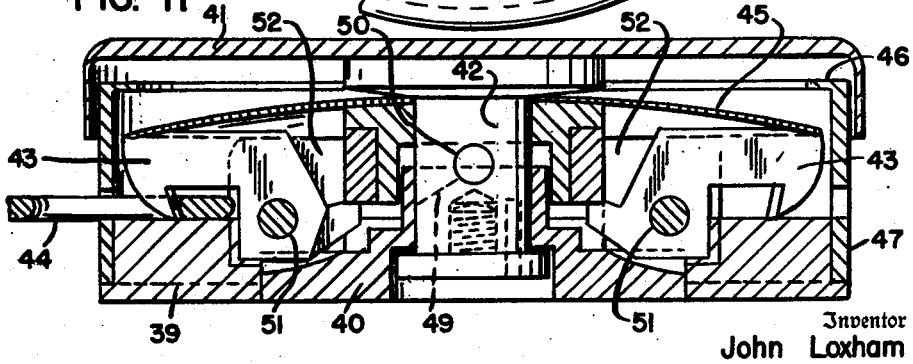

Patented June 16, 1953

2,641,813

UNITED STATES PATENT OFFICE 2,641,813

QUICKLY RELEASABLE CONNECTING DEVICE

John Loxham, Letchworth, England, assignor to Irving Air Chute Company, Inc., Buffalo, N. Y., a corporation Application September 27, 1950, Serial No. 187,096
In Great Britain September 28, 1949

10 Claims. (Cl. 24—205.17)

This invention is concerned with improvements in or relating to quickly releasable connecting devices and is more particularly, though not necessarily exclusively, concerned with so-called "quick-release boxes" for use on parachute harnesses and employed for interconnecting the free ends of the straps of a parachute harness in a manner permitting of the quick freeing of such harness from a wearer, for instance upon landing. Various forms of quick release boxes have already been proposed but many of these have proved to be unduly heavy and some have not been of an appropriately reliable nature.

One of the objects of the present invention is to provide a connecting device which is of a light, compact and very efficient and reliable nature.

According to the present invention there is provided a quickly releasable connecting device comprising a plurality of movably mounted hooks, pins, latches or the like (hereinafter called "latches or the like") adapted to make releasable engagement with the elements to be interconnected, e. g. eyelets or the like located at the free ends of the straps of a parachute harness, means for urging said latches or the like into and out of positions for engagement with said elements, and spring means associated with said latches or the like, characterized in that said spring means comprise a diaphragm or the like of such characteristics that flexure of the center portion of said diaphragm or the like in one direction causes flexure of the peripheral part of such diaphragm in the opposite direction.

The aforesaid diaphragm or the like may be made from spring steel or other suitable flexible and springy material and it may be deformed in any suitable way which results in it having the property of being susceptible to being flexed into either of two stable positions disposed on opposite sides of an unstable position so that when such diaphragm or the like is flexed into a position corresponding to the closed or opened positions of the latches or the like it remains in the selected position until it is positively urged to the other position.

If desired releasable means may be provided for locking the diaphragm or the like in its limiting positions, it being particularly desirable to prevent any inadvertent release movement of the device.

The aforesaid locking means, if provided, may for instance be actuated by rotation of a cap, handle or the like forming part of the connecting device, and, if desired, the release of the device may be effected by depression of said cap, handle or the like, i. e. locking, unlocking and releasing actions may all be effected by different movements of the same member.

The aforesaid latches or the like may be formed integrally with or be mounted on the peripheral part of the above mentioned diaphragm or the like with the result that movements of said latches into their closed and opened positions are effected solely by flexure of the said diaphragm. I prefer however to provide independent latches or the like and to associate these with the diaphragm or the like and with the control means in such a way that movement of the control means in a releasing direction positively moves the latches or the like into their opened positions and effects flexure of the diaphragm or the like into one of its limiting positions while return of said control means to the engaged position effects flexure of said diaphragm to its other limiting position, the resultant movement of the peripheral part of the diaphragm effecting the return of the latches or the like to their closed positions. In this way the release movement of the latches is positively effected while the return movement is resiliently effected and it is accordingly possible to snap the eyelets or the like into engagement with the latches even though the latter are in their closed positions assuming that the ends of the latches are so shaped that side pressure thereon will raise such latches against the spring pressure of the diaphragm.

In cases where the latches or the like are formed integrally with or secured to the diaphragm or the like such diaphragm may be carried by webs, posts or the like extending from the base of the device and circumscribing the center portion of such diaphragm, the said webs, posts or the like preferably being of a flexible nature.

In cases where the latches or the like are independent of the diaphragm the latter may be of annular form and be anchored to an axially movable hub portion of the device, the peripheral portion making direct or indirect engagement with the outer ends of the latches or the like.

In order that the present invention may be well understood I will now describe, by way of examples only, some specific embodiments thereof in application to a so-called quick release box for parachute harnesses, and reference will be made to the accompanying drawings in which:

Figure 1 is a broken plan view of one form of box,

Figure 2 is a cross-sectional view taken on the line II—II of Figure 1, the latches being in their engaged positions, Figure 3 is a part sectional broken side view with the parts set for movement of their released positions, Figure 4 is a cross sectional view similar to that shown in Figure 2 but with the parts in their released positions, Figure 5 is an exploded view of the principal parts of the box shown in Figures 1 to 4, Figure 6 is a broken perspective view of a modified detail of the box shown in Figures 1 to 5, Figure 7 is a cross-sectional side view of another form of box in the locked and engaged position, Figure 8 is a view similar to that of Figure 7 but with the parts set in a condition ready for movement to their released positions, Figure 9 is a view similar to that of Figures 7 and 8 but with the parts in their released positions, Figure 10 is a plan view of a box somewhat similar to that shown in Figures 1 to 5 but having another form of locking means, and Figure 11 is a cross sectional side view taken on the line XI—XI of Figure 10.

Referring to Figures 1 to 5 the quick release box is adapted for releasably interconnecting four strap ends, all of which ends are releasable from the box, but it will of course be understood that the box may be adapted for interconnecting other numbers of strap ends, e. g. six strap ends, and in all cases one of such ends may be permanently connected to the box.

The box comprises a main body or base portion 1 of substantially cylindrical form, a cylindrical side wall 2 and a cap portion 3. The base portion 1 is provided with a central hub portion 4 which may be formed integrally with the base or separately therefrom as shown in the figures, and is provided with a central bore for slidably receiving the stem 5 of a hub portion 6 secured to the cap 3. A sleeve 7 makes screw-threaded engagement with the said hub portion 6 and is so dimensioned that it can pass around the hub portion 4 pursuant to axial sliding movements of the cap 3, said sleeve being locked with respect to the hub by means of a set screw 8.

An annular diaphragm 9 is mounted on the hub portion 6 of the device, said diaphragm being clamped between the head of the hub portion 6 and the above mentioned sleeve 7. This diaphragm is made from springy material and is preset so that it tends to assume a concave or convex condition, i. e. flexure of the center portion from the convex side towards the concave results in the peripheral portion moving with a snap action through an unstable position to a second stable position in which the concave face becomes convex.

Pivotally mounted between lugs 10 upstanding from the base 1 of the device are four latches 11, such latches being radially arranged and disposed for rocking movements towards and away from the base of the device. The outer ends of the said latches are of the hook like form shown in the figures and are adapted when in their engaged positions, i. e. the positions shown in Figures 2 and 3 to trap the eyeletted ends of the straps to be interconnected, one of such eyeletted strap ends being shown in Figures 1 to 4 and designated 12. When however the latches 11 are moved to the disengaged positions as shown in Figure 4 then the strap ends are freed.

The base 1 of the device is recessed as shown in Figures 2 to 4 so as to permit of the pivotal axes of the latches 11 being substantially in the plane of the upper surface of the said base 1 and so as to receive the inner ends of said latches. The extreme inner ends of the latches are adapted to be engaged by the abovementioned sleeve 7 with the result that when the cap 3 is depressed from the position shown in Figures 2 and 3 into the position shown in Figure 4 the latches 11 are rocked from the engaged position shown in the said Figures 2 and 3 into the disengaged position shown in Figure 4.

Pressure on the cap 3 towards the base 1 initially causes the periphery of the diaphragm 9 to press on the outer ends of the latches but at the same time there is a direct inward thrust on the tail portions of the latches 11 and such latches accordingly move towards their disengaged positions. The pressure between the outer ends of the latches and the peripheral part of the diaphragm accordingly increases until the plane including the edge of the diaphragm passes to the opposite side of the parallel plane including the center portion of such diaphragm whereupon the diaphragm snaps to its second stable position in which its periphery abuts against the inturned rim 13 of the side wall 2 of the device as shown in Figure 4 and the diaphragm then resiliently maintains the parts in the disengaged position shown in that figure.

The cap 3 is provided with a skirt portion so as to prevent foreign matter getting underneath the cap and thereby interfering with the required movement towards the base, and slots 14 of dimensions only big enough to permit of the passage of the eyelets 12 are provided in the wall 2 so as to oppose the entry of any foreign matter into the device.

The side faces of the abovementioned lugs 10 are cut away so as to form receiving openings for the eyelets 12 such faces preferably being of arcuate form so as to form recesses more or less conforming with the ends of the eyelets to be received but permitting such eyelets to pivot in the plane of the box.

While it is improbable that in the constructions shown in Figures 1 to 5 of the drawings there could be any possibility of an eyelet being freed from its associated latch by rocking such eyelet in a direction tending to force the latch in an opening direction, the possibility of any such rocking movement can be prevented by slightly modifying the form of the receiving recesses between the lugs 10 e. g. by adopting under-cut slots 15 in slightly modified lugs 10' as shown in Figure 6 instead of open-topped recesses of a width corresponding to the width of the eyelets to be received.

The latches of the device so far described could be moved to their disengaged positions by merely pressing the cap 3 to its innermost position and movement to the engaged positions could be effected by pulling the cap outwardly. It will be appreciated however that it will usually be desirable to adopt means for preventing inadvertent release by accidental pressure on the cap and one form of such means is shown in the figures and will now be described.

A plunger 16 is slidably housed in an aperture extending radially through one of the lugs 10, such plunger having a recess for receiving a spring 17 the inner end of which abuts against the root of the recess and the outer end of which abuts against a stop plug 18 which makes screw-threaded engagement with the end of the recess. The nose portion of the said plunger projects from the lug in which such plunger is slidably housed and engages a cam-like recess in the periphery of the abovementioned sleeve 7. The said cam recess includes a lower track 19 which lies in a plane at right angles to the axis of the sleeve and extends from a depression 20 at one end of the track outwardly towards a crest portion and then returns to a depression 21 at the other end of the track, the arrangement being such that when the cap is in its outermost position i. e. when the latches 11 are in their released positions, the cap can be turned from the position shown in Figure 1 into the position shown in Figure 2 and vice versa, the plunger 16 being urged outwardly as the crest of the cam groove moves towards such plunger and once past the mid-position the plunger assists in turning the cap to its limiting position whereupon the cam groove occupies the position shown in dotted lines and designated 19' in Figure 1 and the plunger engages the terminal depression 20 as shown in Figure 3. The terminal depressions 20 and 21 tend to retain the cap in a position at one of the limits of its range of angular movement but it can nevertheless be turned from one limiting position towards the opposite one upon appropriate torque being applied to the said cap.

The said cam groove has an axially directed extension 22 leading from the end at which the depression 20 is located and a track 23 leads from the head of such extension back to the end 21 of the track 19, such track 23 having a crest portion similar to that of the track 19. The said track 23 is bounded along its face remote from the base of the device by substantially helically disposed wall 24 leading from the outer limit of the extension 22 to the outer limit of the depression 21.

When the cap 3 is in the position shown in Figures 1 and 2 the plunger 16 is in engagement with the depression 21 and the cap cannot be depressed for releasing the latches 11 and rotation of the cap is resiliently opposed. When however it is desired to release the box the cap 3 is turned against the resilient opposition due to the plunger 16 and in the direction of the arrow shown around the hub portion in Figure 1 thereby bringing the cam groove 19 into the dotted line position shown in Figure 1, and the end 20 of the cam groove 19 into registration with the plunger 16 as shown in Figure 3. In this condition the cap 3 is depressed in the direction of the arrow shown in Figure 4 so moving the cam groove extension 22 into registration with the plunger 16 as shown in that figure, and also moving the latches 11 into their released positions. At the same time the diaphragm 9 snaps from the convex position shown in Figures 2 and 3 into the concave position shown in Figure 4 and retains the parts concerned in their released positions.

In order to re-set the device the cap 3 is rotated in an anti-clockwise direction as viewed in Figures 1 to 4 and as the inclined face 24 of the cam track 23 rides over the side wall of the plunger 16 the hub portion 7 carried by the cap 3 is urged away from the base so also urging the center part of the diaphragm 9 away from the base until such time as such diaphragm snaps back to its convex condition and resiliently urges the latches 11 into their engaged positions. The plunger 16 then re-engages the depression 21 and the device is locked against any inadvertent release. When the latches are in their engaged positions the eyeletted strap ends can be inserted, each latch being movable in an opening direction pursuant to inward thrust on its inclined end face.

Referring now to Figures 7 to 9 the construction shown is of a somewhat simpler nature than that already described but is in some respects not as suitable for securing the strap ends of a parachute harness as the release of the latches is only resiliently effected.

In this construction the box again comprises a base 25 having a central hub portion 26, a skirted cap 27 having a hub portion 28 which is rotatably and axially slidably received within the hub 26, and a snap action diaphragm 29. This diaphragm however carries the required latches 30, which latches may be formed integrally with the diaphragm and movement of the latches is accordingly effected solely by flexing of the peripheral part of the diaphragm pursuant to axial movement of its inner part.

The said diaphragm 29 is carried in a position spaced from the base 25 by means of a web 31, the said base, diaphragm and web all being formed integrally as shown on the drawings or being separately formed and interconnected in any suitable way as may be desired.

The center part of the diaphragm 29 is clamped to the head of the hub 24 by means of a collar 32 with the result that upon depression of the cap 27 from the position shown in Figures 7 and 8 into the position shown in Figure 9 the diaphragm 29 changes from the convex condition shown in Figures 7 and 8 into the concave condition shown in Figure 9 and the latches 30 are accordingly moved from their engaged into their disengaged positions. Similarly upon the cap being moved outwardly from the position shown in Figure 9 the diaphragm and web flex to their original positions and restore the latches to their engaged positions.

For the purpose of preventing inadvertent release of the latches 30 the hub portion 28 is provided with a cross pin 33 which projects from the said hub and rides on a cam face 34 formed on the end of the hub 26. This cam face limits the extent of the angular movement of the cap and has an inclined face leading from a crest 35 to a trough 36. When the pin 33 is engaged by the crest of the cam face as shown in Figure 7 depression of the cap 27 is positively prevented. When however the cap is rotated so as to bring the trough 36 of the cam into registration with the said pin, as shown in Figure 8, then the cap can be depressed against the resilient action of the diaphragm 29 so urging the pin 33 into the trough 36 as shown in Figure 9 and causing the diaphragm to snap into the position shown in the last mentioned figure whereupon the said diaphragm resiliently holds the parts in their released conditions. If however the cap is now rotated back to its original position the pin 33 rides up the inclined face of the cam so urging the cap outwardly and eventually bringing about the reversal of the diaphragm to its original position.

When the latches 30 are in their engaged positions the eyelets or the like to be interconnected, two of which are shown in Figures 7 and 8 can be inserted into engagement with such latches by urging them against the inclined outer ends of the latches and thereby urging them in an opening direction against the action of the diaphragm 29. As soon as the openings in the eyelets register with hook portions of the latches the latter drop into their engaged positions so securely trapping the eyelets as shown in Figures 7 and 8.

For the purpose of preventing separation of the cap 27 from the base of the device the base of the hub portion 26 is recessed for slidably and rotatably receiving a disc 37 which is secured to the hub portion 28 for instance by means of a screw 38.

The arrangement shown in Figures 10 and 11 is similar to that shown in Figures 1 to 5 but has locking means somewhat similar to those incorporated in the arrangement shown in Figures 7 to 9. Thus the device includes a base 39 having a hollow hub portion 40, a skirted cap 41 having a hub portion 42 adapted to be slidably and rotatably received within the hub portion 40, independent pivoted latches 43 having outer hook-like ends for engagement with eyelets 44 on the members to be interconnected and inner ends for cooperation with a sleeve forming part of the movable hub portion of the cap assembly and a snap action spring diaphragm 45 for urging the latches into their engaged position when the cap is in its outermost position and for maintaining the latches in their disengaged positions when such cap is in its innermost position.

The center portion of the diaphragm 45 is anchored to the head of the hub portion 42 and as in the case of the arrangement shown in Figures 1 to 5 a flange 46 around the upper periphery of the side wall 47 of the device forms an abutment for the outer periphery of the diaphragm when such diaphragm is snapped from the position shown in Figure 11 into its concave condition.

The base of the hub 40 is recessed to receive a disc 48 which is secured to the hub 42 so as to form an abutment limiting the outward movement of the cap assembly.

The upper end face of the socket portion of the hub 40 is contoured in the form of a cam 49 for engagement by a pin 50 projecting from the stem of the hub portion 42, said cam being of substantially helical form as in the case of the cam described with reference to Figures 7 to 9 so that when the parts are in the positions shown in Figure 11 depression of the cap is prevented but when the cap is turned so as to bring the lowermost part of the cam surface into alignment with the pin the cap can be depressed so opening the latches 43 and snapping the diaphragm into its concave condition.

The above mentioned latches 43, as in the case of the arrangement shown in Figures 1 to 5, are pivoted on spindles 51 extending between lugs 52 upstanding from the base portion of the device, such spindles being locked in passages extending through the lugs, for instance by means of locking pins 53.

While I have hereinbefore described some embodiments of the present invention I wish it to be understood that there may be various changes without departing from the scope of such invention. Thus for instance there may be changes in the method of mounting the snap action spring like diaphragm and such diaphragm instead of being formed integrally with or acting directly on the latches or the like may be so disposed as to act on such latches indirectly for instance through the intermediary of subsidiary levers, anti-friction bearings or the like. It is also within the scope of the present invention to adopt various other forms of locking means for preventing inadvertent release of the device.

I claim:

1. In a quick releasable connecting device for parachute harness fastener lugs and the like, the combination of a supporting body, said supporting body having a slot therein to receive a parachute harness strap lug for connection to said supporting body, a latch pivoted between its ends upon said supporting body having a detent at one side of the pivot axis for releasably restraining the lug upon said body, a dish shaped diaphragm-like spring mounted upon said body of a nature to reversibly flex so that its periphery moves upon said body for holding the latch at its detent end into locking position with respect to a fastener lug and also to assume a position permitting release movement of said latch with respect to such a lug, and means upon said supporting body for flexing said spring between its latch holding and latch releasing positions.

2. A coupling such as described in claim 1 in which said last mentioned means includes means to engage said latch at the opposite side of its pivot axis with respect to the detent end for positively moving said latch to a fastener lug releasing position upon said supporting body.

3. In a quick release coupling the combination of a supporting body having slots therein for receiving apertured parachute strap fastener parts, detents pivoted upon said supporting body having restraining ends for releasably engaging the apertured fastener parts to hold them in said slots and upon the supporting body, a rotatable and axially extensible and depressible reciprocating member mounted upon said supporting body, a dish shaped diaphragm spring centrally secured to said member of such nature that the periphery thereof will flex from one side of a plane thru said central portion normal to the axis of said coupling to the opposite side thereof into a stable condition either in the first position or the second position mentioned, said peripheral portion of the diaphragm engaging said detents to hold them in fastener part securing relation upon the supporting body, and means connected for axial movement upon said body with said member for throwing the detents to a releasing position upon axial depressible movement of said member upon said supporting body.

4. Harness quick release coupling structure comprising a supporting body having slots therein for receiving apertured fastener parts, a rotatable and depressible member mounted upon said supporting body for reciprocation axially thereof to enable the same to be depressed or extended with respect to the supporting body, a flexible reversible dish shaped diaphragm spring, hub means centrally connecting said diaphragm spring to said member axially and centrally of the diaphragm spring means and associating the spring with said body so that upon movement of the central portion of the spring through movement of the hub means the peripheral portion of said spring can be moved to positions at opposite sides of a plane normal to the axis of movement of said member, latches movably mounted within said supporting body for movement into and out of fastener part restraining position with respect to said slots, said spring at its outer portion being associated with the latches to move the latter when the spring is flexed to one side of said plane to hold the latches in a fastener part restraining position, a stationary extension mounted upon said supporting body, said hub means having a cam slot therein into which said extension projects to prevent depressible movement of said member upon said supporting body until the said member has been rotated to a predetermined position.

5. A harness quick release coupling comprising a shallow supporting body, a rotatable hub structure mounted upon said supporting body for axial reciprocation, means connected to the supporting body and the hub for holding the hub in either depressed or extended positions upon said body, a dish shaped diaphragm spring centrally connected to said hub in position thereon with respect to the supporting body so that the same may be moved at its outer peripheral portion from a stable position to one side of a plane normal to the hub axis through an unstable position to a second stable position at the opposite side of said plane, and parachute strap connecting latches operatively mounted in said body and connected with said diaphragm spring for movement by the spring to parachute strap restraining positions.

6. A coupling as defined in claim 5 in which the hub is operatively connected to said latches for moving them upon depression of the hub to strap releasing positions.

7. A harness quick release coupling structure for connecting the body straps of a harness together comprising a shallow supporting body, a reciprocating hub structure mounted upon said body for movement to extended and retracted positions thereon, means connecting the hub structure with the body for releasably holding the hub structure in said extended or retracted positions with respect to the supporting body, a diaphragm dish shaped spring connected centrally to said hub structure having a normal stable position to one side of a plane normal to the axis of the hub structure and movable therefrom through an unstable position to a stable position in reversely dished condition at the opposite side of said plane, and harness strap restraining latches connected with said diaphragm spring and movable therewith to assume harness strap restraining and release positions.

8. A harness quick release coupling structure for securing the straps of the body harness upon a wearer comprising a shallow dish shaped supporting body having lateral slots opening thereinto for receiving the strap connecting portions of a harness, strap restraining and releasing latches pivoted upon the supporting body and movable across said slots, a cover cap for said supporting body, a hub structure centrally and fixedly connected to said cap and extending into said supporting body, means provided upon the supporting body and upon the hub structure to permit rotatable and depressible movements of the cap and hub structure and to releasably hold the cap and hub structure in either of said positions, a dished shaped diaphragm spring centrally connected to said hub and movable at its outer portions from one stable position to one side of a plane normal to the hub through an unstable position to a stable position at the opposite side of said plane, said supporting body having means thereon associated with the hub to enable such movements, the diaphragm spring at its outer peripheral portion engaging the latches for moving the latches from a strap release position to a strap restraining position, and means on the latches engaging the hub for movement of the latches from a strap restraining position to a strap release position upon depression of the hub and cap.

9. In a coupling construction for connecting parachute harness straps and the like together upon a wearer, the combination of a supporting body, a dish shaped spring constructed so that it may be flexed from one stable position in which the outer portion lies to one side of the center through an unstable position to a second stable reversed position in which the peripheral portion lies at the opposite side of the center, a control means reciprocably mounted upon said supporting body, means fixedly connecting the central portion of the said spring means in fixed non-slidable position upon the reciprocable control means so that the dish shaped spring may be moved from one side of its center to the other as above mentioned, and latches movably mounted upon the supporting body and associated with said dish shaped spring and its control means for their movement between harness strap releasing and restraining positions.

10. In a coupling construction for connecting harness straps together upon a wearer, the combination of a supporting body, a dish shaped spring so constructed that it can be flexed from one stable dished position in which the outer portion lies to one side of its center through an unstable position to a second stable reversely dished position in which the peripheral portion lies at the opposite side of the center, means mounting said spring upon and within the body including a reciprocable control means mounted upon said body for moving the dish shaped spring between the positions designated, harness strap latches movably mounted with respect to the supporting body having the same associated with the outer peripheral portions of the spring and the control means for movement of the latches into and out of strap restraining position.

JOHN LOXHAM.

References Cited in the file of this patent

UNITED STATES PATENTS

| Number | Name | Date |
| --- | --- | --- |
| 1,176,632 | Werner | Mar. 21, 1916 |
| 1,899,656 | Wigley et al. | Feb. 28, 1933 |
| 2,404,909 | Johnston | July 30, 1946 |
| 2,430,341 | Johnston | Nov. 4, 1947 |
| 2,516,236 | Moorhead et al. | July 25, 1950 |
| 2,546,689 | Frieder et al. | Mar. 27, 1951 |

FOREIGN PATENTS

| Number | Country | Date |
| --- | --- | --- |
| 571,760 | France | Feb. 8, 1924 |
| 335,580 | Italy | of 1936 |
| 508,243 | Great Britain | of 1939 |